United States Patent
Veerabadran et al.

(10) Patent No.: US 8,677,078 B1
(45) Date of Patent: Mar. 18, 2014

(54) SYSTEMS AND METHODS FOR ACCESSING WIDE REGISTERS

(75) Inventors: Karthikeyan Veerabadran, Alviso, CA (US); David J. Ofelt, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 947 days.

(21) Appl. No.: 11/769,988

(22) Filed: Jun. 28, 2007

(51) Int. Cl.
*G06F 12/00* (2006.01)
*G06F 13/00* (2006.01)
*G06F 13/28* (2006.01)
*G06F 15/00* (2006.01)
*G06F 15/76* (2006.01)
*G06F 9/30* (2006.01)
*G06F 9/40* (2006.01)
*G06F 13/12* (2006.01)
*G06F 13/38* (2006.01)
*G06F 13/40* (2006.01)

(52) U.S. Cl.
USPC ........... 711/154; 711/100; 711/101; 711/170; 711/171; 712/27; 712/33; 712/215; 712/225; 712/1; 710/307; 710/66

(58) Field of Classification Search
None
See application file for complete search history.

(56) References Cited

U.S. PATENT DOCUMENTS

| 5,125,083 | A * | 6/1992 | Fite et al. ...................... 712/207 |
| 7,620,756 | B2 * | 11/2009 | Gara et al. ...................... 710/66 |
| 2002/0105522 | A1 * | 8/2002 | Kolluru et al. ................. 345/519 |
| 2006/0085590 | A1 * | 4/2006 | Davy et al. ..................... 711/108 |
| 2006/0092320 | A1 * | 5/2006 | Nickerson et al. ............ 348/441 |
| 2006/0200647 | A1 * | 9/2006 | Cohen ............................. 712/34 |
| 2006/0218332 | A1 * | 9/2006 | Boudreau ...................... 710/307 |

* cited by examiner

*Primary Examiner* — Sanjiv Shah
*Assistant Examiner* — Marwan Ayash
(74) *Attorney, Agent, or Firm* — Harrity & Harrity, LLP

(57) ABSTRACT

A device for managing multiple instructions to access multiple wide registers may include logic to receive the multiple instructions to access one of the multiple wide registers, associate each received instruction with a corresponding one of multiple buffer memories, and allow simultaneous processing of the multiple instructions associated with each of the multiple buffer memories, where the multiple instructions are processed such that data is transferred between the multiple buffer memories and the multiple wide registers in one operation.

20 Claims, 5 Drawing Sheets

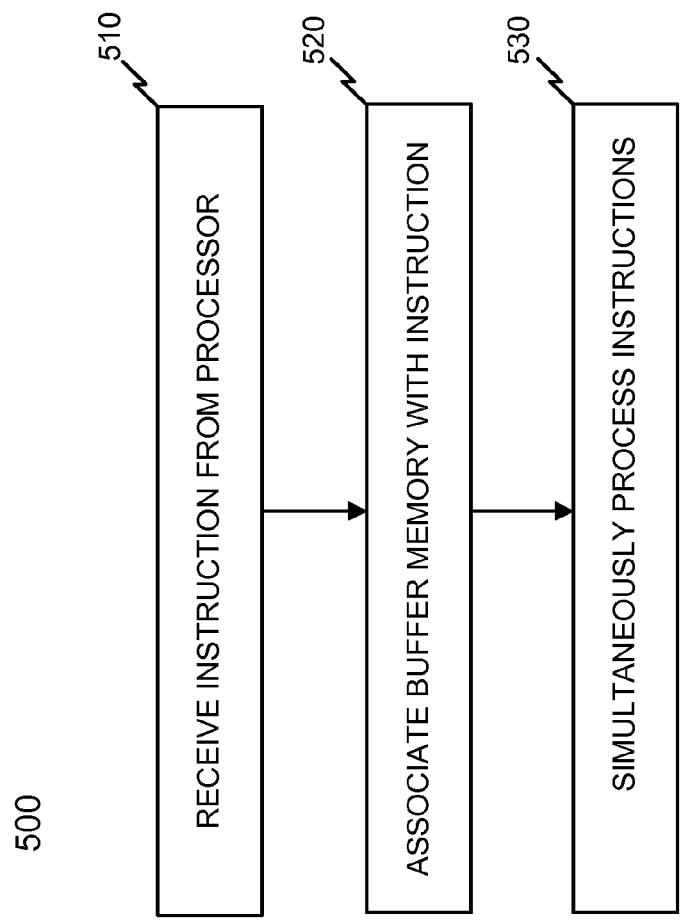

SYSTEMS AND METHODS FOR ACCESSING WIDE REGISTERS

BACKGROUND

In some existing systems it becomes necessary to use wide registers that contain more bits of data than the system data bus may carry at one time. These types of systems will therefore require multiple data read/write operations over the system data bus in order to provide the full amount of data to/from a wide register. Requiring multiple software operations for a single wide register operation slows down the system. Existing hardware solutions to compensate for this problem include using shadow registers for each wide register. Such hardware solutions are not feasible, however, due to their cost.

SUMMARY

According to one aspect, a method may include receiving a read instruction from a processor to read data comprised of multiple words stored in a wide register, transmitting a first word of the data to the processor and transmitting all of the multiple words of the data from the wide register to a buffer memory in response to the received read instruction, and transmitting remaining words of the data to the processor from the buffer memory.

According to another aspect, a device may include a processor, a data bus that may transmit one word of data in one operation, a plurality of wide registers for storing data comprising a plurality of words, and logic configured to: receive an instruction from the processor to read data in a wide register, transmit a first word of the data to the processor and transmit all of the plurality of the words of the data from a wide register into a buffer memory in response to the received instruction, and transmit remaining words of the data from the buffer memory to the processor via the data bus.

According to still another aspect, a method may include receiving and storing in a buffer memory a first word of data to write into a wide register, receiving a size of the wide register, receiving remaining words of the data until the size of all the received words of data stored in the buffer memory equals the received size of the wide register; and writing all the received words from the buffer memory into the wide register in one operation.

According to a further aspect, a device may include a plurality of wide registers, a plurality of buffer memories, and logic configured to: receive words of data in a buffer memory to be written into a wide register, receive a size of the wide register, determine when the size of the received words in the buffer memory equals the size of the wide register, and write all the words in the buffer memory into a wide register in one write operation based on the determining.

According to still a further aspect, a device may include a plurality of buffers, a plurality of wide registers, and logic configured to: receive a plurality of instructions to access one of the plurality of wide registers, associate a buffer memory with each of the received instructions, determine the size of a wide register associated with a buffer memory, and allow data to be transferred between a wide register and an associated buffer memory when the data may be transferred in one operation.

According to yet another aspect, a method may include receiving a plurality of instructions to access one of a plurality of wide registers, associating each received instruction with a buffer memory, and allowing simultaneous processing of the instructions associated with each buffer memory wherein the instructions are processed such that data is transferred between a buffer memory and a wide register in one operation.

BRIEF DESCRIPTION OF THE DRAWINGS

The accompanying drawings, which are incorporated in and constitute a part of this specification, illustrate embodiments described herein and, together with the description, explain the embodiments. In the drawings.

FIG. 5 is a flow chart of an exemplary process for processing a plurality of instructions that access a wide register module.

DETAILED DESCRIPTION

The following detailed description of the embodiments refers to the accompanying drawings. The same reference numbers in different drawings may identify the same or similar elements. Also, the following detailed description does not limit the embodiments.

Implementations described herein may allow read and write instructions received from a processor of a device to access data stored in wide registers of the device. In other implementations, a number of instructions may be processed simultaneously such that data transmitted to/from a wide register may be performed in one operation using an interface bus.

Exemplary Device Configuration

Figure 1:
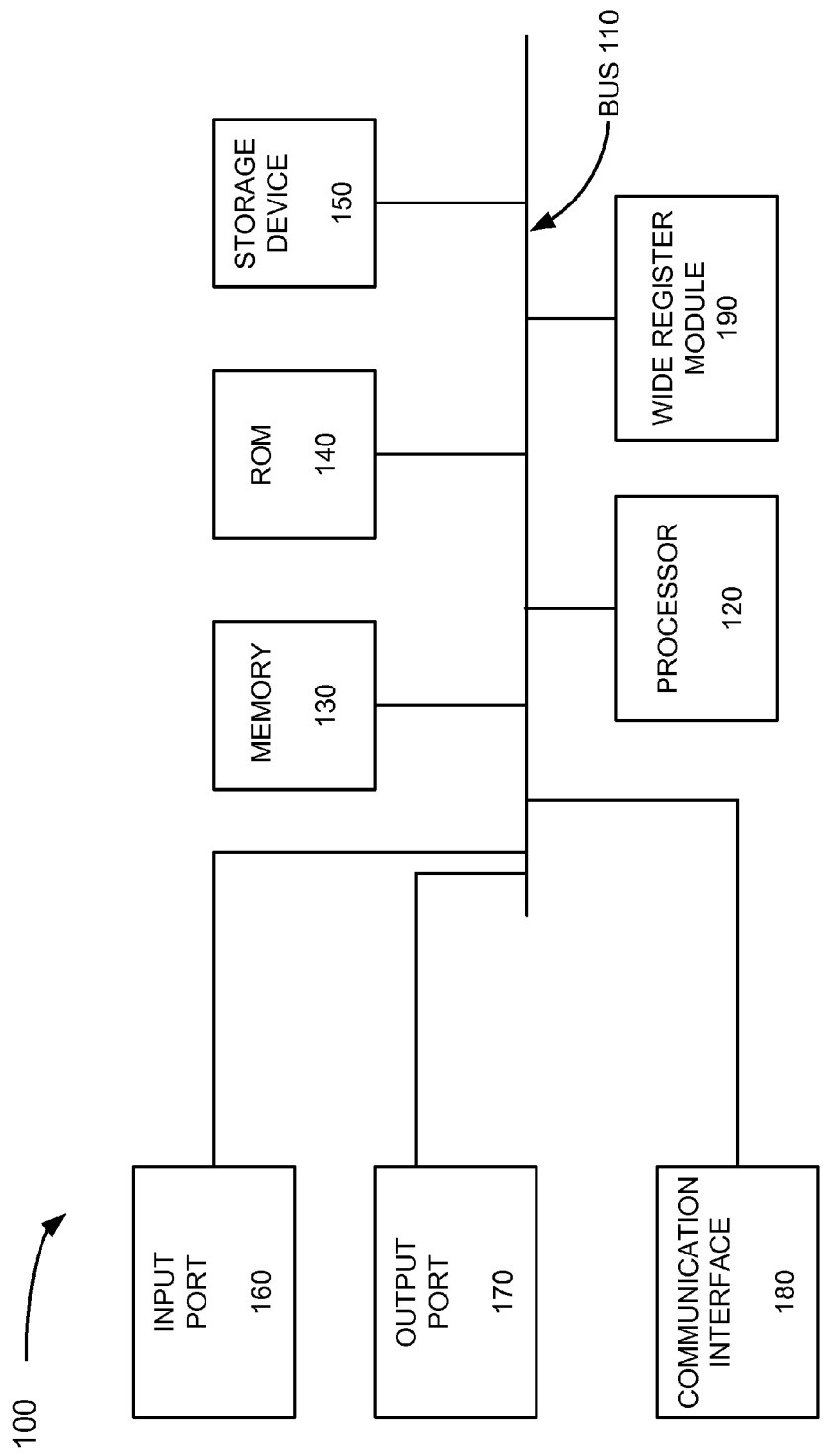
FIG. 1 is a diagram of an exemplary device according to implementations described herein.

FIG. 1 is a diagram of an exemplary device 100. In one implementation, device 100 may take the form of an application specific integrated circuit (ASIC). In another implementation, device 100 may be used as an ASIC in a network device, such as a router, a web server, a switch, or the like. In other implementations, device 100 may take the form of another type of device, such as processing logic (e.g. a field programmable gate array (FPGA), etc.).

Figure 2:
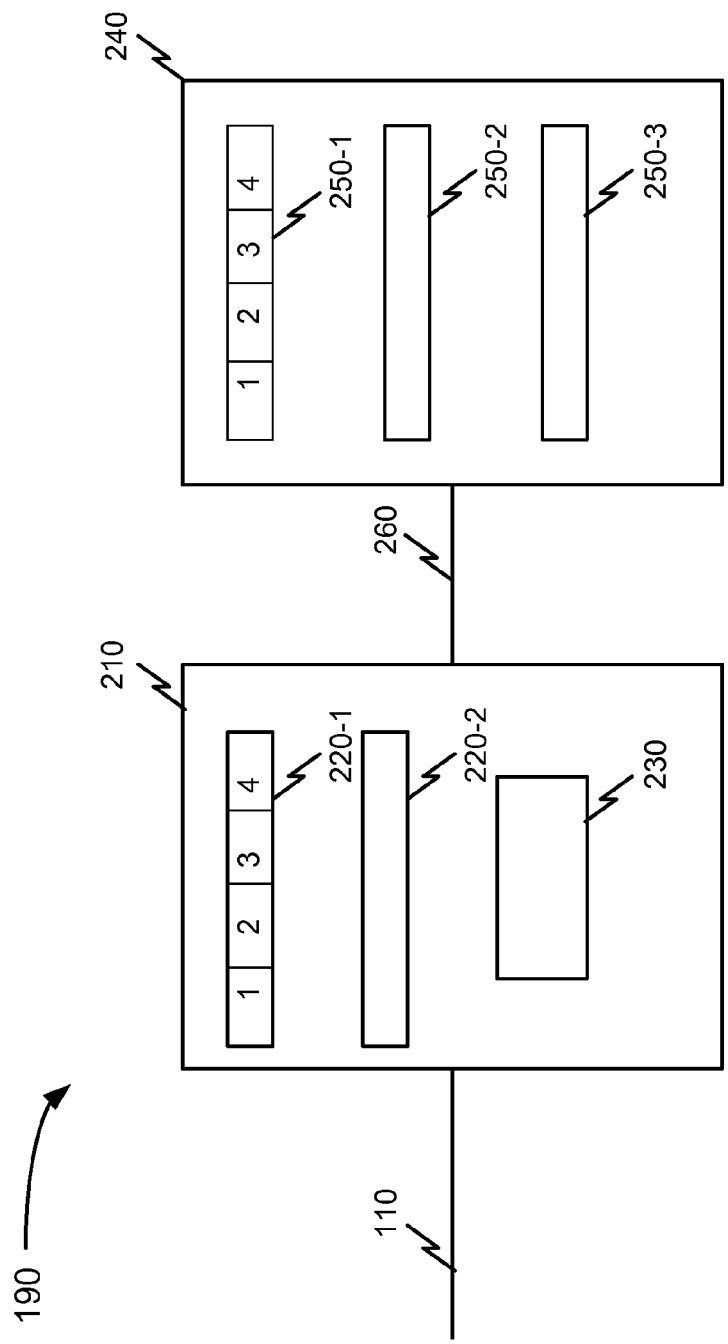
FIG. 2 is a diagram of an exemplary wide register module of the exemplary device depicted in FIG. 1.

As shown in FIG. 2, device 100 may include a bus 110, a processor 120, a memory 130, a read only memory (ROM) 140, a storage device 150, an input port 160, an output port 170, a communication interface 180, and/or a wide register module 190. Device 100 may also include one or more power supplies (not shown).

Bus 110 may provide a pathway that permits communication among the components of device 100. For example, bus 110 may allow communications of 8, 16, 32 or 64 bits of data. Processor 120 may include any type of processor, microprocessor, or processing logic that may interpret and execute instructions. Processor 120 may also execute instructions for performing reading and writing operations to wide register module 190.

Memory 130 may include a random access memory (RAM) or another type of dynamic storage device that stores information. ROM 140 may include a ROM device and/or another type of static storage device that may store static information and instructions for processor 120. Storage device 150 may include any type of magnetic or optical recording medium and its corresponding drive for storing information and instructions. Storage device 150 may also include a flash memory (e.g., an electrically erasable programmable read only memory (EEPROM)) device for storing information and instructions. Storage device 150 may also be used to store temporary variables or other intermediate information during execution of instructions by processor 120.

Input device 160 may include one or more mechanisms that permit data to be input to device 100, such as a keyboard, a mouse, a pen, a microphone, voice recognition and/or biometric mechanisms, etc. Output device 170 may include one or more mechanisms that may output data from device 100, such as a display, a printer, a speaker, etc.

Communication interface 180 may include any transceiver-like mechanism that enables device 100 to communicate with other devices and/or systems. For example, communication interface 180 may include a modem or an Ethernet interface to a LAN. In addition, communication interface 180 may include other mechanisms for communicating via a network.

Wide register module 190 may include a plurality of wide registers that store data that may be larger than data that may be transmitted via bus 110 in one operation. For example, wide register module 190 may store 128 bits of data, but bus 110 may transmit 32 bits of data in one operation. Wide register module 190 may also contain logic for receiving instructions from processor 120 and logic for accessing and transmitting data contained within wide register module 190.

According to an exemplary implementation, device 100 may perform various processes in response to processor 120 executing sequences of instructions contained in a computer-readable medium (e.g., ROM 140). A computer-readable medium may include one or more memory devices or carrier waves. Such instructions may be read into memory 130 from another computer-readable medium, such as ROM 140 and/or storage device 150, or from a separate device via communication interface 180. Execution of the sequences of instructions contained in memory may cause processor 120 to perform the acts described herein. In alternative embodiments, hardwired circuitry may be used in place of or in combination with software instructions to implement aspects of the embodiments. Thus, the systems and methods described herein are not limited to any specific combination of hardware circuitry and software.

Although FIG. 1 shows exemplary components of device 100, in other implementations, device 100 may contain fewer, different, or additional components than depicted in FIG. 1. In still other implementations, one or more components of device 100 may perform the tasks performed by one or more other components of device 100.

Exemplary Wide Register Module Configuration

FIG. 2 shows an exemplary embodiment of wide register module 190 that may be implemented within device 100. As illustrated Wide register module 190 may include a wide register buffer 210, a plurality of buffer memories 220-1 and 220-2 (collectively referred to as "buffer memories 220"), wide register logic 230, a wide register block 240, a plurality of wide registers 250-1 through 250-3 (collectively referred to as "wide registers 250") and an interface bus 260. In other embodiments, wide register module 190 may be contained within processor 120, or may be contained within a device other than device 100. In one implementation, data stored in wide register module 190 may be used for specific purposes, such as for programmable input/output (PIO) functions.

Wide register buffer 210 may include hardware and/or software logic for transmitting, receiving, and/or storing data. In exemplary embodiments, data stored in wide register buffer 210 may be larger than the size of data capable of being transmitted by bus 110 in one operation. For example, data stored in wide register buffer 210 may be 128 bits of data, but bus 110 may be capable of transmitting 32 bits of data in one operation. Wide register buffer 210 may transmit and/or receive read and write instructions and data to and/or from processor 120 via bus 110, and may transmit/receive read and write instructions and data to/from wide register block 240 via bus 260. In one implementation, wide register buffer 210 may include a number of buffer memories 220 and wide register logic 230.

Buffer memories 220 may include any type of memory that may store data. Data stored in buffer memories 220 may be transmitted/received to/from processor 120 and wide register block 240. In one example, buffer memories 220 may be configured to be equal or substantially equal in size to wide registers 250. As further shown in FIG. 2, buffer memories 220 may be configured to store four words each containing 32 bits of data, where the four 32-bit words may include a single 128-bit wide data. In other implementations, buffer memories 220 may be configured to store 2, 8, 32 or any number of 32 bit words that may comprise a single wide data.

Wide register logic 230 may include hardware and/or software logic for controlling the transmission, reception, and/or storage of data in buffer memories 220. For example, wide register logic 230 may receive data and read/write commands or instructions from processor 120 via bus 110. Wide register logic 230 may also receive data and/or signals from wide register block 240 via interface bus 260. Wide register logic 230 may receive a signal from wide register block 240 indicating the size of wide registers 250. In response to receiving an instruction to access wide register block 240, wide register logic 230 may associate a single one of buffer memories 220 with the received instruction from processor 120. Wide register logic 230 may determine if the single one of buffer memories 220 is filled with words of data and may perform simultaneous instructions such that data may be transmitted from buffer memories 220 to wide register block 240 in one operation via interface bus 260, as described in detail below.

Wide register block 240 may include may include any type of memory for storing data. Wide register block 240 may include a number of addressable memory locations for storing data. Storage within wide register block 240 may include storing data within a plurality of wide registers 250. Wide register block 240 may include one or more memories (e.g., RAMs) that provide temporary, permanent, and/or semi-permanent storage of data.

Wide registers 250 may include memories configured to store a number of words of data together to form one wide data. For example, wide register 250 may store four 32-bit words of data as one 128-bit wide data. Memory locations for storing each word in wide registers 250 may be individually addressed.

Interface bus 260 may include a data bus capable of transmitting data between wide register buffer 210 and wide register block 240. In exemplary embodiments, interface bus 260 may be a 32-bit bus and may transmit multiple words of data in one operation. For example, interface bus 260 may transmit four 32-bit words from wide register 250-1 to buffer memory 220-1 in one data transmission operation.

Although FIG. 2 shows exemplary components of wide register module 190, in other implementations, wide register module 190 may contain fewer, different, or additional components than depicted in FIG. 2. For example, wide registers 250 may store data that is not an integer multiple of the size of bus 110 and/or bus 260. For example, wide registers 250 may store data that is 48 bits wide, where bus 110 may be a 32 bit bus. Further, the size of interface bus 260 may not be an integer multiple of the size of bus 110. For example, interface bus 260 may be a 48 bit bus while bus 110 may be a 32 bit bus. In still other implementations, one or more components of wide register module 190 may perform the tasks performed by one or more other components of wide register module 190.

Exemplary Processes

Figure 3:
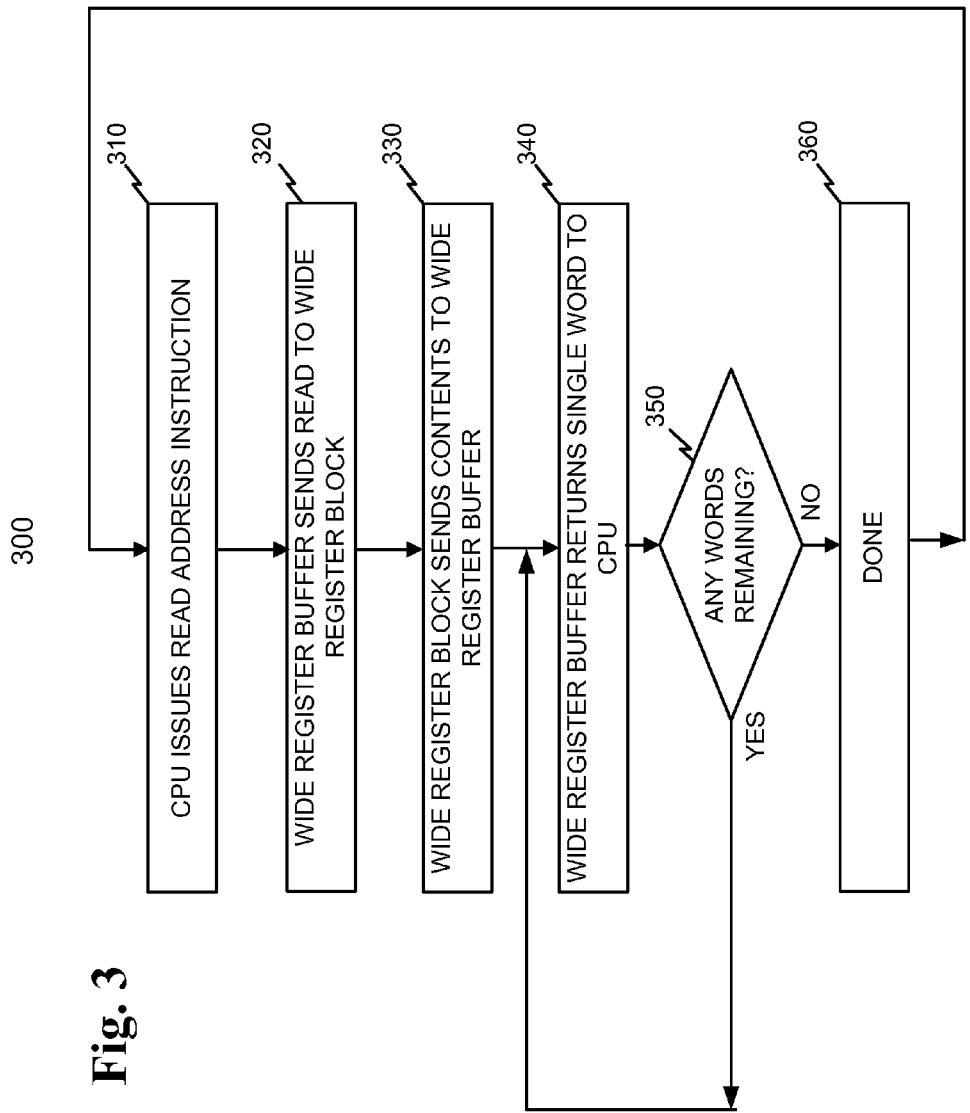
FIG. 3 is a flow chart of an exemplary process for reading from a wide register module.

FIG. 3 is a flow chart of an exemplary process 300 for reading data from wide register module 190. Process 300 may begin if processor 120 issues a read address instruction (block 310). For example, processor 120 may be running a program that requires reading data from one of wide registers 250 of wide register module 190. The read address instruction may be transmitted from processor 120 to wide register buffer 210, via bus 110. The read address instruction may be transmitted from wide register buffer 210 to wide register block 240, via interface bus 260 (block 320). For example, wide register logic 230 may direct the read address instruction to the appropriate one of wide registers 250 within wide register block 240.

As further shown in FIG. 3, the entire contents of the addressed one of wide registers 250 within wide register block 240 may be transmitted to wide register buffer 210 (block 330). As described above in connection with FIG. 2, interface bus 260 may transmit four words (each word being 32 bits) of data from wide register 250-1 to buffer memory 220-1. Additionally, in response to the read address instruction, wide register logic 230 may transmit the first word of data from buffer memory 220-1 to processor 120, via bus 110 (block 340). In this manner, processor 120 may receive the first word of the data read from wide register 250-1, in response to the read address instruction transmitted in block 310 of process 300.

Process 300 may determine if there are any remaining words of data to be transmitted back to processor 120 (block 350). For example, if the data being read from wide register 250-1 contains four words of data and the first word (word 1) has been returned to processor 120, block 350 may determine that there are remaining words of data stored in buffer memory 220-1 to be transmitted back to processor 120 (block 350—YES). If there are remaining words of data in buffer memory 220-1, process 300 may return to block 340 and the next word of data may be transmitted to processor 120. For example, if word 1 has been transmitted to processor 120, the next word (word 2) may be transmitted, via bus 110, to processor 120 (block 340). Again it may be determined if there are words of data remaining in buffer memory 220-1 to be transmitted back to processor 120 (block 350). Continuing with this example, if word 3 and word 4 remain to be transmitted, blocks 340 and 350 may be performed to transmit word 3 from buffer memory 220-1 and then to transmit word 4 from buffer memory 220-1 to processor 120. After word 4 of the data has been transmitted from buffer 220-1, it may be determined that there are no more remaining words (block 350—NO). Process 300 may then be finished (block 360).

In other examples, the number of words contained in one of wide registers 250 may be more or less than four words, as described above. For example, wide register 250-1 may store 8, 16, 32, etc. words of data. In other examples, wide register 250-1 may store one or two words of data. If data stored a wide register 250-1 contains only one word of data, the single word of data may be transmitted back to processor 120 in block 340, and block 350 may determine that are no remaining words and the process may cease. In still further examples, the size of the data stored in a wide register 250-1 may not be an integer multiple of the size of bus 110, where in this example, the last bits of data remaining to be transmitted from buffer memory 220 to processor 120 may be a fraction (i.e. half) of a full "word" of data. For example, buffer memory 220 may send a 32 bit word of data and then send 16 bits of data to processor 120 in two successive operations, in order to read 48 bit wide data from a wide register 250.

Figure 4:
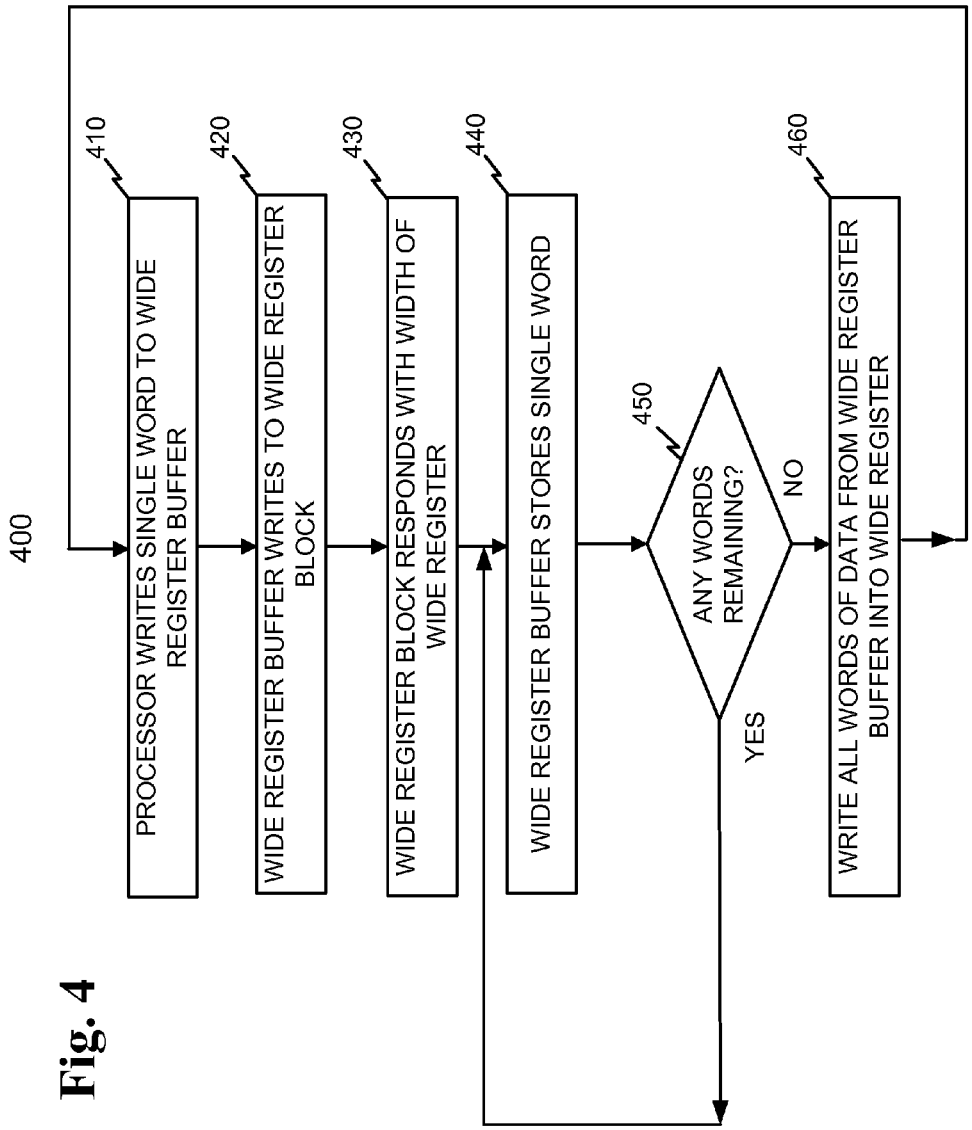
FIG. 4 is a flow chart of an exemplary process for writing to a wide register module.

FIG. 4 is a flow chart illustrating an exemplary process 400 for writing data into wide register module 190. Process 400 may begin if processor 120 writes a single word of data to wide register buffer 210 (block 410). For example, processor 120 may be running a program that requires writing data to one of wide registers 250 contained in wide register module 190. The first word of data to be written at an address may be transmitted from processor 120 to one of buffer memories 220 within wide register buffer 210, via bus 110. The wide register buffer 210 may write this first word to a wide register (block 420). For example, wide register logic 230 may transmit (via interface bus 260) the first word to be written to an address in the appropriate wide register 250 within wide register block 240.

As further shown in FIG. 4, in response to receiving the first word of data, wide register block 240 may respond with a width of one of wide registers 250 (block 430). For example, wide register block 240 may respond to wide register logic 230 with a signal indicating that the width of one of wide registers 250 is four words. In another example, if the width of one of wide registers 250 is only one word, the received word may be stored in wide register block 240 and wide register block 240 may respond with a signal indicating that the wide register is one word wide.

Based on the received width of wide registers 250, wide register logic 230 may store the first word in buffer memory 220 (block 440). For example, wide register logic 230 may instigate a write operation of data to be written to wide register block 240 if all the words of data have been stored within buffer memory 220. In this manner, writing operations into wide register block 240 may be performed in one operation, via interface bus 260.

As further shown in FIG. 4, it may be determined if any words are remaining to be written into buffer memory 220 from processor 120 (block 450). For example, if wide register block 240 responded that wide register 250-1 contains 4 words of data and only the first word (word 1) has been stored in buffer memory 220-1, wide register logic 230 may determine that there are remaining words of data to be stored in buffer memory 220-1 (block 450—YES). If there are remaining words of data to be received from processor 120 and stored in buffer memory 220-1, process 400 may return to block 440 and the next word of data may be transmitted from processor 120 and stored in buffer memory 220-1 within wide register buffer 210. After word 1 has been transmitted from processor 120, the next word (word 2) may be transmitted, via bus 110, from processor 120 and stored in buffer memory 220 (block 440). Again it may be determined if there are words of data remaining to be written into buffer memory 220-1 to be transmitted from processor 120 (block 450). Continuing with this example, if word 3 and word 4 remain to be transmitted, blocks 440 and 450 may be performed to transmit word 3 to buffer memory 220-1 and then to transmit word 4 to buffer memory 220-1 from processor 120. After word 4 of the data has been transmitted to buffer 220-1, it may be determined by wide register logic 230 that there are no remaining words to be transmitted (block 450—NO).

If there are no more words of data that remain to be transmitted from processor 120 to buffer memory 220-1, all the words of the data may be written to one of wide registers 250 (block 460). For example, all four words stored in buffer memory 220-1 may be transmitted, via interface bus 260, into wide register 250-1.

In other examples, the number of words contained in one of wide registers 250 may be more or less than four words, as described above. For example, each one of wide registers 250 may store 8, 16, and/or 32 words of data. In other examples, one of wide registers 250 may store one or two words of data. If data stored one of wide registers 250 contains only one word of data, this one word of data may be transmitted back to processor 120 in block 440, and block 450 may determine that are no remaining words and process 400 may cease. In still further examples, the size of the data written into a wide register 250-1 may not be an integer multiple of the size of bus 110, where in this example, the last bits of data remaining to be written from processor 120 to buffer memory 220 may be a fraction (i.e. half) of a full "word" of data. For example, processor 120 may send a 32 bit word of data and then send 16 bits of data to a buffer memory 220 in successive operations, in order to write 48 bit wide data into a wide register 250.

FIG. 5 is a flow chart illustrating an exemplary process 500 for accessing wide register module 190. Although only one processor 120 is shown in FIG. 1, exemplary process 500 may be performed using additional processors that may be contained within device 100 or may be located external to device 100. Processors located external to device 100 may access wide register module 190 via communication interface 180. Process 500 may also be performed with one processor (such as processor 120) executing multiple instructions.

As shown in FIG. 5, process 500 may begin if wide register buffer 210 receives an instruction from processor 120 (block 510). For example, processor 120 may be performing a calculation requiring data that may be currently stored in a wide register 250 contained in wide register module 190. Processor 120 may execute a read address instruction where the read address is located in one of wide registers 250. The read instruction from processor 120 is received by wide register logic 230 contained in wide register buffer 210 (block 510). Upon receiving an instruction from processor 120 (or another processor not shown) wide register logic 230 may associate a specific buffer memory 220 with the received instruction (block 520).

After associating a buffer memory 220 with a received instruction, wide register logic 230 may simultaneously process multiple instructions (block 530). For example, processor 120 may issue two separate read instructions to read data within wide registers 250 (block 510). In this example, each read instruction may be associated with a specific one of buffer memories 220 (block 520). Regarding the first received read instruction, as described above in connection with FIG. 3, the entire contents (all the words) of data stored in one of wide registers 250 may be transferred into one of buffer memories 220. In response to the second received read instruction, the entire contents of the specific one of wide registers 250 may be transmitted into the associated one of buffer memories 220. The data stored in buffer memories 220 for both read instructions may be transmitted back to processor 120 one 32-bit word at a time, via bus 110. In one example, the four words of data from buffer memory 220-1 may be transmitted sequentially, and, if finished, may be transmitted to processor 120. In other examples, a first word from buffer 220-1 may be transmitted, and then a first word from buffer 220-2 may be transmitted, followed by the second word from buffer 220-1, and then the second word from buffer 220-2. In this manner wide register logic 230 may simultaneously receive instructions from processor 120 while transmitting data to/from wide register block 240.

In other examples, wide register logic 230 may simultaneously process two write instructions and/or may process a read and write instruction simultaneously. Although only two buffer memories 220 are shown, it is understood that more buffer memories 220 may be contained in wide register buffer 210 in order to process any number of instructions simultaneously.

As described above in connection with FIGS. 3-5, wide register logic 230 may initiate reading and writing operations to/from wide register block 240, via interface bus 260, that may include all the words of data in one operation. This may ensure that multiple instructions (issued from one or many processors) may not access (e.g., may not be reading/writing to) the same wide register 250 at the same time, which may ensure that the data contained in a wide register 250 is not corrupted.

CONCLUSION

Implementations described herein may allow read and write instructions received from a processor to access data stored in wide registers. In other implementations, a number of instructions may be processed simultaneously such that data transmitted to/from a wide register may be performed in one operation using an interface bus.

The foregoing description of preferred embodiments of the present embodiments provides illustration and description, but is not intended to be exhaustive or to limit the embodiments to the precise form disclosed. Modifications and variations are possible in light of the above teachings or may be acquired from practice of the embodiments. For example, while a series of acts has been described with regard to FIGS. 3-5, the order of the acts may differ or be performed in parallel in other implementations consistent with the present embodiments.

No element, act, or instruction used in the description of the principles of the embodiments should be construed as critical unless explicitly described as such. Also as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, from a processor of a device, a first read instruction to read first multiple words of data and a second read instruction to read second multiple words of data,
the first read instruction identifying a particular wide register, of a plurality of wide registers of the device, that stores the first multiple words of data, and
the second read instruction identifying another wide register, of the plurality of wide registers of the device, that stores the second multiple words of data;
transmitting, from the particular wide register and via a first data bus of the device, an entirety of content, stored in the particular wide register, to a particular buffer memory of a plurality of buffer memories of the device, the entirety of content including the first multiple words, and
the entirety of content being transmitted to the particular buffer memory based on the first read instruction, the first data bus transmitting a plurality of words of data per operation, the entirety of content being transmitted to the particular buffer memory, via the first data bus, in one operation, and the plurality of buffer memories being different than the plurality of wide registers;

transmitting, from the other wide register and via the first data bus, an entirety of content, stored in the other wide register, to another buffer memory of the plurality of buffer memories, the entirety of content, stored in the other wide register, including the second multiple words, the entirety of content, stored in the other wide register, being transmitted to the other buffer memory based on the second read instruction; and alternatively transmitting, from the particular buffer memory and from the other buffer memory, each word of the first multiple words and each word of the second multiple words, each word of the first multiple words and each word of the second multiple words being alternatively transmitted to the processor via a second data bus of the device, the second data bus being different than the first data bus, the second data bus transmitting only one word of data per operation, each word, of the first multiple words, and each word, of the second multiple words, being transmitted via the second data bus in a respective one of a plurality of operations, alternatively transmitting each word of the first multiple words and each word of the second multiple words including:

transmitting, from the particular buffer memory and via the second data bus, a first word of the first multiple words to the processor in a single operation of the plurality of operations, and transmitting, from the other buffer memory and via the second data bus, a first word of the second multiple words to the processor in another single operation, of the plurality of operations, after transmitting the first word of the first multiple words.

2. The method of claim 1, where a size of the particular buffer memory is equal to a size of the particular wide register.

3. The method of claim 2, where alternatively transmitting each word of the first multiple words and each word of the second multiple words further includes:

transmitting a second word of the first multiple words, from the particular buffer memory, to the processor via the second data bus after transmitting the first word of the second multiple words to the processor; and transmitting a second word of the second multiple words, via the second data bus, from the other buffer memory to the processor after transmitting the second word of the first multiple words to the processor.

4. The method of claim 1, where the received first read instruction comprises an address associated with the particular wide register, and where the first multiple words are transmitted, based on the address, from the particular wide register to the particular buffer memory.

5. A device comprising:

a processor;

a data bus to transmit a single word of data per operation; and a wide register module including:

an interface bus to transmit multiple words of data per operation, the interface bus being different from the data bus, a plurality of wide registers to store data, and a plurality of buffer memories, each of the plurality of buffer memories being different than each of the plurality of wide registers, and a hardware component to:

receive, from the processor, a first instruction to read data stored in one of the plurality of wide registers and a second instruction to read data stored in another one of the plurality of wide registers, the first instruction including information identifying the one of plurality of wide registers, the data, stored in the one of the plurality of wide registers, including a first plurality of words, the second instruction including information identifying the other one of plurality of wide registers, the data, stored in the other one of the plurality of wide registers, including a second plurality of words, transmit, in a single operation and based on the first instruction, an entirety of content, stored in the one of the plurality of wide registers, to a particular buffer memory of the plurality of buffer memories, the entirety of content including the first plurality of words and being transmitted to the particular buffer memory via the interface bus, the particular buffer memory and the one of the plurality of wide registers being equal in size, transmit, in a single operation and based on the second instruction, an entirety of content, stored in the other one of the plurality of wide registers, to another buffer memory of the plurality of buffer memories, the entirety of content, stored in the other one of the plurality of wide registers, including the second plurality of words and being transmitted to the other buffer memory via the interface bus, the other buffer memory and the other one of the plurality of wide registers being equal in size, and alternatively transmit, in a respective one of a plurality of separate operations, each word of the first plurality of words in the particular buffer memory and each word of the second plurality of words in the other buffer memory to the processor via the data bus, when alternatively transmitting each word of the first plurality of words and each word of the second plurality of words, the hardware component is to:

transmit, in a single operation of the plurality of separate operations, a first word of the first plurality of words from the particular buffer memory to the processor via the data bus, and transmit, via the data bus and in another single operation of the plurality of separate operations, a first word of the second plurality of words from the other buffer memory to the processor after transmitting the first word of the first plurality of words.

6. The device of claim 5, where the hardware component is further to:

determine a quantity of the first plurality of words that are stored in the one of the plurality of wide registers, and transmit, based on the determined quantity of the first plurality of words and via the data bus, each word, of the first plurality of words, from the particular buffer memory to the processor,
where a quantity of the plurality of separate operations is based on the quantity of the first plurality of words.

7. The device of claim 6, where the hardware component is further to:
determine, based on the quantity of the first plurality of words, that each word of the first plurality of words has been transmitted from the particular buffer memory to the processor.

8. The device of claim 5, where the first instruction comprises an address associated with the one of the plurality of wide registers, and
where the first plurality of words are transmitted from the one of the plurality of wide registers to the particular buffer memory based on the address.

9. The method of claim 1, where a size of each word, of the first multiple words or the second multiple words, transmitted to the processor via the second data bus, is equal to a size of each word transmitted, per operation, via the second data bus.

10. The method of claim 1, where a size of data transmitted via the first data bus is an integer multiple of a size of data transmitted via the first-second data bus.

11. The device of claim 5,
where the interface bus only connects the plurality of buffer memories to the plurality of wide registers, and
where the data bus connects the plurality of buffer memories to the processor.

12. The device of claim 5, where a size of each word, of the first plurality of words and the second plurality of words, is thirty-two bits, and
where a size of data that is transmitted, in each operation via the data bus, is thirty-two bits.

13. The device of claim 5, where a size of the one of the plurality of wide registers is a multiple of thirty-two bits.

14. A device comprising:
a plurality of buffer memories;
a plurality of wide registers; and
a hardware component to:
receive, from a processor, a plurality of instructions to access data in the plurality of wide registers,
associate each of the plurality of instructions with a different one of the plurality of buffer memories,
transfer first words of data, via a first data bus and in one operation, between a first one of the plurality of wide registers and a first one of the plurality of buffer memories,
the first words of data being transferred based on a first one of the plurality of instructions,
the first data bus transmitting a plurality of words of data per operation,
transfer second words of data, via the first data bus and in one other operation, between a second one of the plurality of wide registers and a second one of the plurality of buffer memories that is different than the first one of the plurality of buffer memories,
the second one of the plurality of wide registers being different than the first one of the plurality of wide registers,
the second words of data being transferred based on a second one of the plurality of instructions that is different than the first one of the plurality of instructions, and
alternatively transmit, to the processor, each word of the first words of data from the first one of the plurality of buffer memories, and each word of the second words of data from the second one of the plurality of buffer memories to the processor,
each word, of the first words of data, and each word, of the second words of data, being alternatively transmitted to the processor via the second data bus, based on the first one of the plurality of instructions and the second one of the plurality of instructions,
the second data bus being different than the first data bus, and
the second data bus transmitting a single word of data per operation.

15. The device of claim 14, where the first one of the plurality of instructions is a read operation, and
where, when transferring the first words of data between the first one of the plurality of wide registers and the first one of the plurality of buffer memories, the hardware component is to:
cause an entirety of data, stored in the first one of the plurality of wide registers, to be transmitted, in one operation via the first data bus, to the first one of the plurality of buffer memories.

16. The device of claim 14,
where the second one of the plurality of instructions is a read operation, and
where, when transferring the second words of data between the second one of the plurality of wide registers and the second one of the plurality of buffer memories, the hardware component is to:
cause an entirety of data, stored in the second one of the plurality of wide registers, to be transmitted, in one operation via the first data bus, to the second one of the plurality of buffer memories.

17. A method comprising:
receiving, from a processor, a plurality of instructions to access a plurality of wide registers;
associating each of the plurality of instructions with a corresponding one of a plurality of buffer memories; and
simultaneously processing the plurality of instructions,
simultaneously processing the plurality of instructions including:
transferring, via a first data bus, a first plurality of words of first data between a first one of the plurality of buffer memories and a first one of the plurality of wide registers in one operation, based on a first one of the plurality of instructions that is associated with the first one of the plurality of wide registers,
the first data bus transmitting a plurality of words of data per operation;
transferring, via the first data bus, a second plurality of words of second data between a second one of the plurality of buffer memories and a second one of the plurality of wide registers in one operation, based on a second one of the plurality of instructions that is associated with the second one of the plurality of wide registers; and
alternatively transmitting each word, of the first plurality of words, and each word, of the second plurality of words, to the processor via a second data bus,
the second data bus being different than the first data bus,
the second data bus transmitting a single word of data per operation.

18. The method of claim 17, where the first one of the plurality of instructions includes a read operation, and where transferring the first plurality of words of first data between the first one of the plurality of buffer memories and the first one of the plurality of wide registers includes:
  causing, based on the read operation, an entirety of data, stored in the first one of the plurality of wide registers, to be transmitted, in one operation via the first data bus, to the first one of the plurality of buffer memories.

19. The method of claim 17,
where alternatively transmitting each word of the first plurality of words and each word of the second plurality of words includes:
  transferring a first word of the first plurality of words, via the second data bus, to the processor, and
  transferring a first word of the second plurality of words, via the second data bus, to the processor after transferring the first word of the first plurality of words.

20. The method of claim 17, where transferring, via the first data bus, the first plurality of words between the first one of the plurality of buffer memories and the first one of the plurality of wide registers in one operation includes:
  transferring, via the first data bus, an entirety of content, stored in the first one of the plurality of wide registers, to the first one of the plurality of buffer memories in one operation, and
where transferring, via the first data bus, the second plurality of words between the second one of the plurality of buffer memories and the second one of the plurality of wide registers in one operation includes:
  transferring, via the first data bus, an entirety of content, stored in the second one of the plurality of wide registers, to the second one of the plurality of buffer memories in one operation.

* * * * *

UNITED STATES PATENT AND TRADEMARK OFFICE
CERTIFICATE OF CORRECTION

| | | |
|---|---|---|
| PATENT NO. | : 8,677,078 B1 | Page 1 of 1 |
| APPLICATION NO. | : 11/769988 | |
| DATED | : March 18, 2014 | |
| INVENTOR(S) | : Karthikeyan Veerabadran et al. | |

It is certified that error appears in the above-identified patent and that said Letters Patent is hereby corrected as shown below:

In the Claims:

Please correct claim 10 as follows:

Column 11, line 25, after "via the" delete "first-".

Signed and Sealed this
Twenty-second Day of July, 2014

Michelle K. Lee
*Deputy Director of the United States Patent and Trademark Office*